United States Patent
Akiyama

(10) Patent No.: US 9,733,551 B2
(45) Date of Patent: Aug. 15, 2017

(54) VARIABLE-POSITION OPERATION DEVICE

(71) Applicant: RICOH IMAGING COMPANY, LTD., Tokyo (JP)

(72) Inventor: Kazuhiro Akiyama, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 14/817,594

(22) Filed: Aug. 4, 2015

(65) Prior Publication Data
US 2016/0062214 A1  Mar. 3, 2016

(30) Foreign Application Priority Data
Aug. 26, 2014  (JP) .................... 2014-171959

(51) Int. Cl.
G03B 17/02 (2006.01)
G03B 15/03 (2006.01)
G03B 17/18 (2006.01)

(52) U.S. Cl.
CPC ............. *G03B 17/02* (2013.01); *G03B 17/18* (2013.01)

(58) Field of Classification Search
CPC ......... G03B 7/02; G03B 17/02; H04N 5/2251
USPC .......... 396/166, 297, 299, 535; 348/373–376
See application file for complete search history.

(56) References Cited

U.S. PATENT DOCUMENTS

| | | | | |
|---|---|---|---|---|
| 5,283,606 A | * | 2/1994 | Konno | G03B 7/091 396/299 |
| 6,341,202 B1 | * | 1/2002 | Hosokawa | G03B 17/00 396/281 |
| 6,683,653 B1 | * | 1/2004 | Miyake | H04N 1/2158 348/373 |
| 2002/0012066 A1 | | 1/2002 | Nagai | |
| 2002/0023826 A1 | * | 2/2002 | Miwa | H01H 25/065 200/4 |

FOREIGN PATENT DOCUMENTS

| | | |
|---|---|---|
| JP | 08-334818 | 12/1996 |
| JP | 11-219639 | 8/1999 |
| JP | 2000-098439 | 4/2000 |
| JP | 2000-098477 | 4/2000 |
| JP | 2000-147628 | 5/2000 |
| JP | 2001-005075 | 1/2001 |
| JP | 2001-042409 | 2/2001 |

* cited by examiner

*Primary Examiner* — Rochelle-Ann J Blackman
(74) *Attorney, Agent, or Firm* — Greenblum & Bernstein, P.L.C.

(57) ABSTRACT

A variable-position operation device, provided on an electronic-device body, includes a variable-position operation member which shifts upon an operation thereof; a first electrical contact which shifts in accordance with the operation of the variable-position operation member; a second electrical contact which detects a shifted position of the first electrical contact, which is in sliding contact with the second electrical contact, in accordance with a shifted position of the variable-position operation member; and at least one light-emitting element, wherein a light-emitting state of the light-emitting element changes in accordance with the shifted position of the variable-position operation member. The second electrical contact is provided on a first board. The light-emitting element is provided on a second board, the second board being provided as a separate member from that of the first board.

24 Claims, 5 Drawing Sheets

VARIABLE-POSITION OPERATION DEVICE

BACKGROUND OF THE INVENTION

1. Field of the Invention

The present invention relates to a variable-position operation device which causes a plurality of light-emitting elements to selectively emit light in accordance with a shift position of a variable-position operation member, and guides the emitted light to a display part of the variable-position operation member.

2. Description of Related Art

For example, digital cameras of recent years are typically provided with a rotational operation dial (rotational operation member) which selects various photographic modes and operations, and peripheral display parts of the rotational operation dial are made to selectively emit light in order to further improve the visual confirmation ability thereof (Japanese Unexamined Patent Publication Nos. H11-219639 and 2001-005075).

In such a rotational operation dial, in order to detect the rotational position of the rotational operation dial, a brush is fixed to the rotational operation dial, and a circuit board provided with lands, to which the brush comes in sliding contact with, is fixed onto the body of the device (digital camera). Furthermore, a plurality of light-emitting elements are provided on aback surface (inner surface) of the rotational operation dial, in which at least the display parts thereof are transparent; these light-emitting elements are selectively made to emit light.

In the related art, it is technical common sense to provide lands, to which the brush is in slidable contact, and light-emitting elements on the same surface (side) of the same board (circuit board). However, according to the inventor of the present invention, if the space between the lands and the light-emitting elements (surface mounted LEDs), which are soldered onto the same surface of the same board, is narrow, there is a risk of the melted solder short-circuiting between the terminals of the light-emitting elements and the lands, and there is a risk of the contacting surfaces between the lands and the brush becoming contaminated. Accordingly, a sufficiently wide space must be provided between the lands and the light-emitting elements, which hinders miniaturization (reduction in the diameter) of the rotational operation dial. In particular, in a configuration in which a push-button switch is provided at an inner peripheral side (inner radial position) of the rotational operation dial, a switch element(s) for the push-button switch must be provided on the same surface on which the lands are provided and at the inner peripheral side (inner radial position) of the lands, so that there is a risk of the lands and the terminals of the switch element short circuiting caused by soldering. Accordingly, a sufficient amount of space must be obtained between the lands, the light-emitting elements and the switch element(s), causing difficulties in reducing (miniaturizing) the mounting area and the surface area of the board (circuit board), thereby causing difficulties in miniaturizing (miniaturizing the diameter of) the rotational operation dial (rotational operation member).

SUMMARY OF THE INVENTION

The present invention has been devised in view of the above-mentioned problems and provides a variable-position operation device which can be miniaturized (reduced in diameter).

According to an aspect of the present invention, a variable-position operation device, provided on an electronic-device body, is provided, including a variable-position operation member which shifts upon an operation thereof; a first electrical contact which shifts in accordance with the operation of the variable-position operation member; a second electrical contact which detects a shifted position of the first electrical contact, which is in sliding contact with the second electrical contact, in accordance with a shifted position of the variable-position operation member; and at least one light-emitting element, wherein a light-emitting state of the light-emitting element changes in accordance with the shifted position of the variable-position operation member. The second electrical contact is provided on a first board. The light-emitting element is provided on a second board, the second board being provided as a separate member from that of the first board.

It is desirable for the variable-position operation member to include a rotational operation member, wherein the second electrical contact is formed in a circular-arc shape that is concentric with a rotational center of the rotational operation member, the second board includes a round opening which exposes the second electrical contact, provided on the first board, and each the light-emitting element is provided on the second board along the round opening.

It is desirable for a plurality of the light-emitting elements to be provided, and for at least one of the light-emitting elements to emit a different colored light from that of the remaining the light-emitting elements.

It is desirable for at least one depressing-operation member to be provided at an inner radial position within the rotational operation member, and for a depression-detection member which detects a depressing of the depressing-operation member is provided on the first board.

In an embodiment a variable-position operation device, provided on an electronic-device body, is provided, including a variable-position operation member which shifts upon an operation thereof; a first electrical contact which shifts in accordance with the operation of the variable-position operation member; a second electrical contact which detects a shifted position of the first electrical contact, which is in sliding contact with the second electrical contact, in accordance with a shifted position of the variable-position operation member; and at least one light-emitting element, wherein a light-emitting state of the light-emitting element changes in accordance with the shifted position of the variable-position operation member. The second electrical contact is provided on a first board, the light-emitting element is provided on a second board, and the first board and the second board are detachable from each other.

In an embodiment a variable-position operation device, provided on an electronic-device body, is provided, including a variable-position operation member which shifts upon an operation thereof; a first electrical contact which shifts in accordance with the operation of the variable-position operation member; a second electrical contact which detects a shifted position of the first electrical contact, which is in sliding contact with the second electrical contact, in accordance with a shifted position of the variable-position operation member; and at least one light-emitting element, wherein a light-emitting state of the light-emitting element changes in accordance with the shifted position of the variable-position operation member. The second electrical contact is provided on a first board, the light-emitting element is provided on a second board, and the first board and the second board overlay each other and are provided in the electronic-device body.

According to the present invention, miniaturization (miniaturization of the diameter) of the variable-position operation device is possible using a first board provided with lands and a second board provided with a plurality of light-emitting elements.

The present disclosure relates to subject matter contained in Japanese Patent Application No. 2014-171959 (filed on Aug. 26, 2014) which is expressly incorporated herein in its entirety.

BRIEF DESCRIPTION OF THE DRAWINGS

The present invention will be discussed below in detail with reference to the accompanying drawings, in which.

DESCRIPTION OF THE EMBODIMENTS

Figure 1:
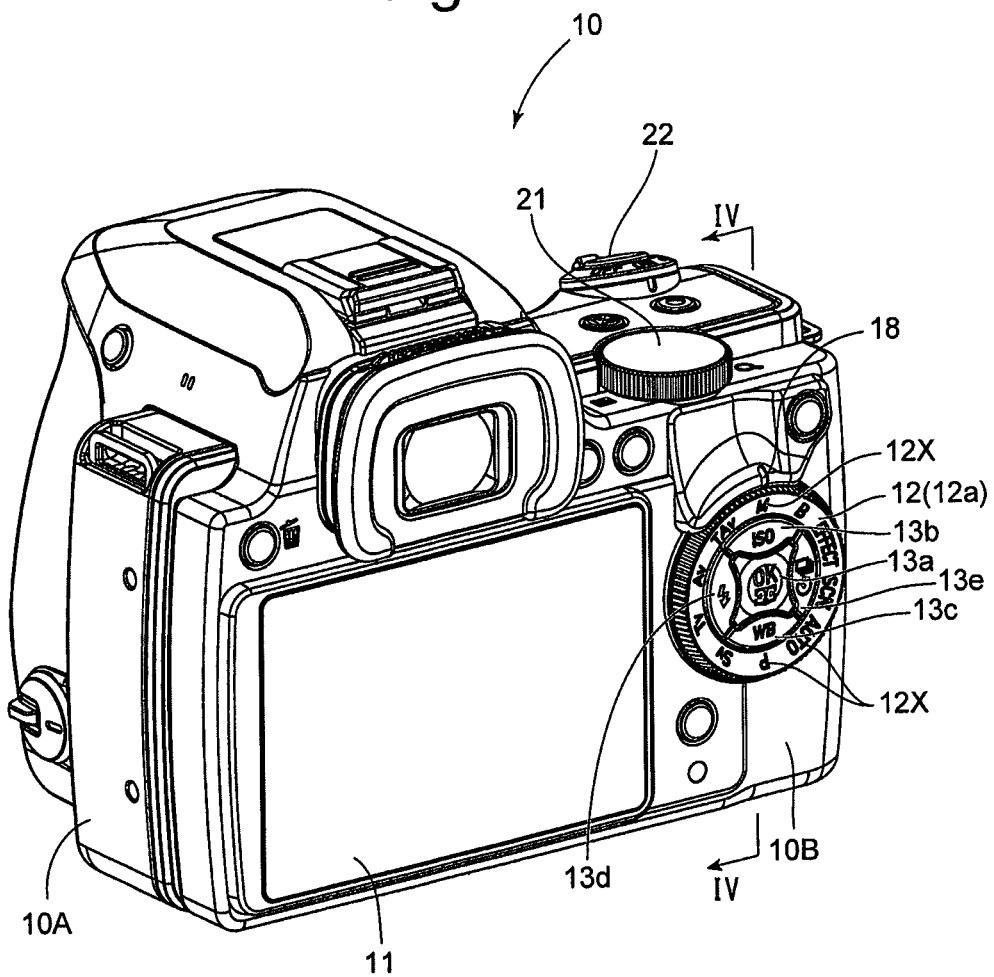
FIG. 1 is a rear perspective view showing main components of a single-lens reflex (SLR) digital camera, to which the variable-position operation device of the present invention is applied.
Figure 2:
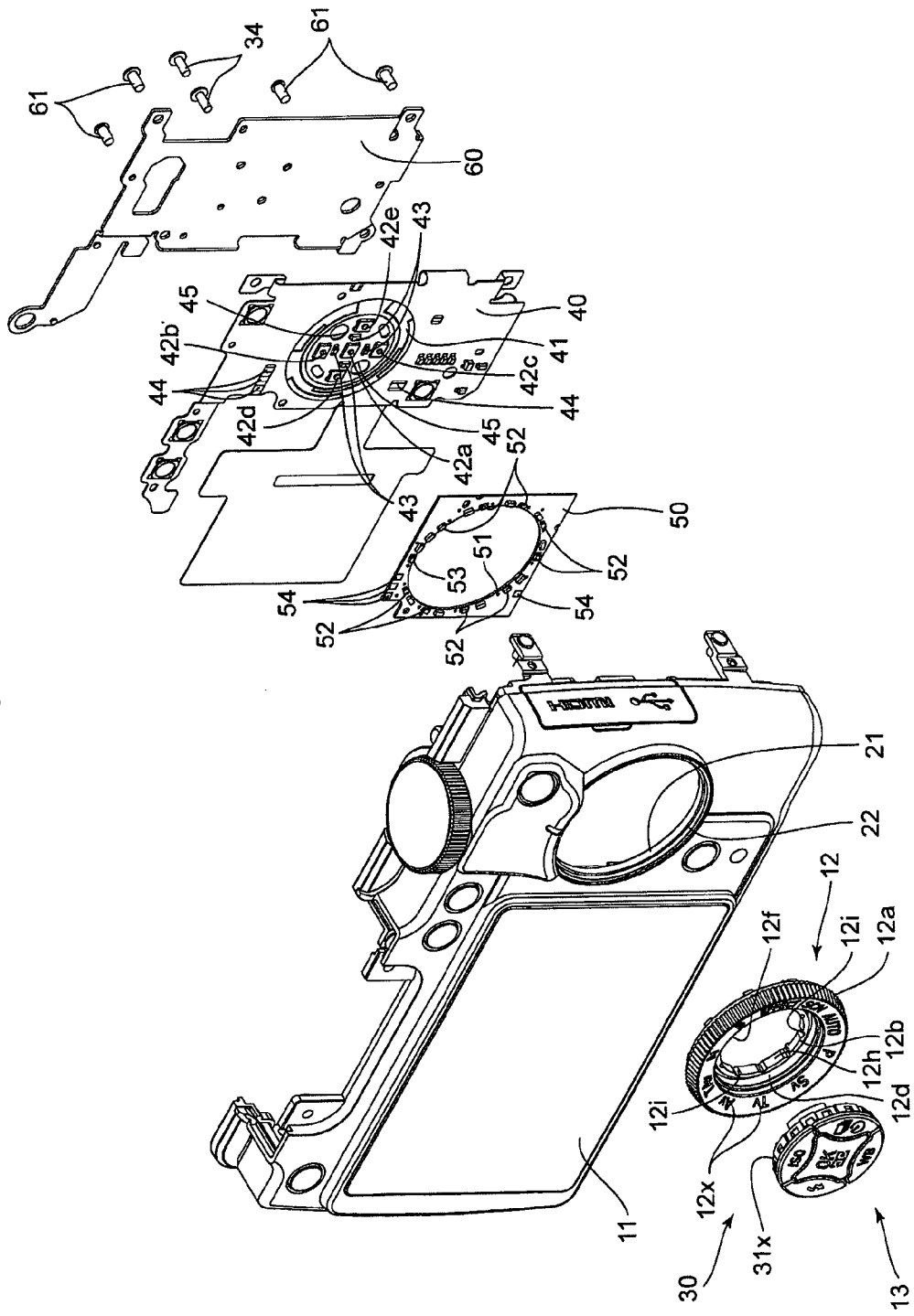
FIG. 2 is an exploded view of the variable-position operation device shown in FIG. 1.

In the illustrated embodiment, the present invention is applied to a variable-position operation device (multi-function switch device) 100 of an SLR (single-lens reflex) digital camera. As shown in FIGS. 1 and 2, a camera body (electronic-device body) 10 is provided with a large LCD screen 11 on a body rear-side (rear-side forming member/device-body rear side) 10B of the camera body 10, and a rotational operation dial (rotational operation member/variable-position operation member) 12 is provided beside the LCD screen 11 on the right side thereof. The rotational operation dial 12 of the illustrated embodiment is a mode dial having a round shape in a front elevational view (when viewing the rear side of the camera body 10), and push-button switches (switch group) 13 are provided in an internal space of the rotational operation dial 12.

In the illustrated embodiment, the present invention is applied to the variable-position operation device 100 which includes the rotational operation dial 12 and the push-button switches 13. A round opening 21, which has a diameter that is slightly smaller than the outer diameter of the rotational operation dial 12, is formed through the body rear-side 10B, and a round guide stepped portion (rotational guide portion/track/rail) 22 which is concentric with the round opening 21 is formed on the circumferential edge of the round opening 21 and projects rearwardly therefrom (see FIGS. 2 and 4).

Figure 4:
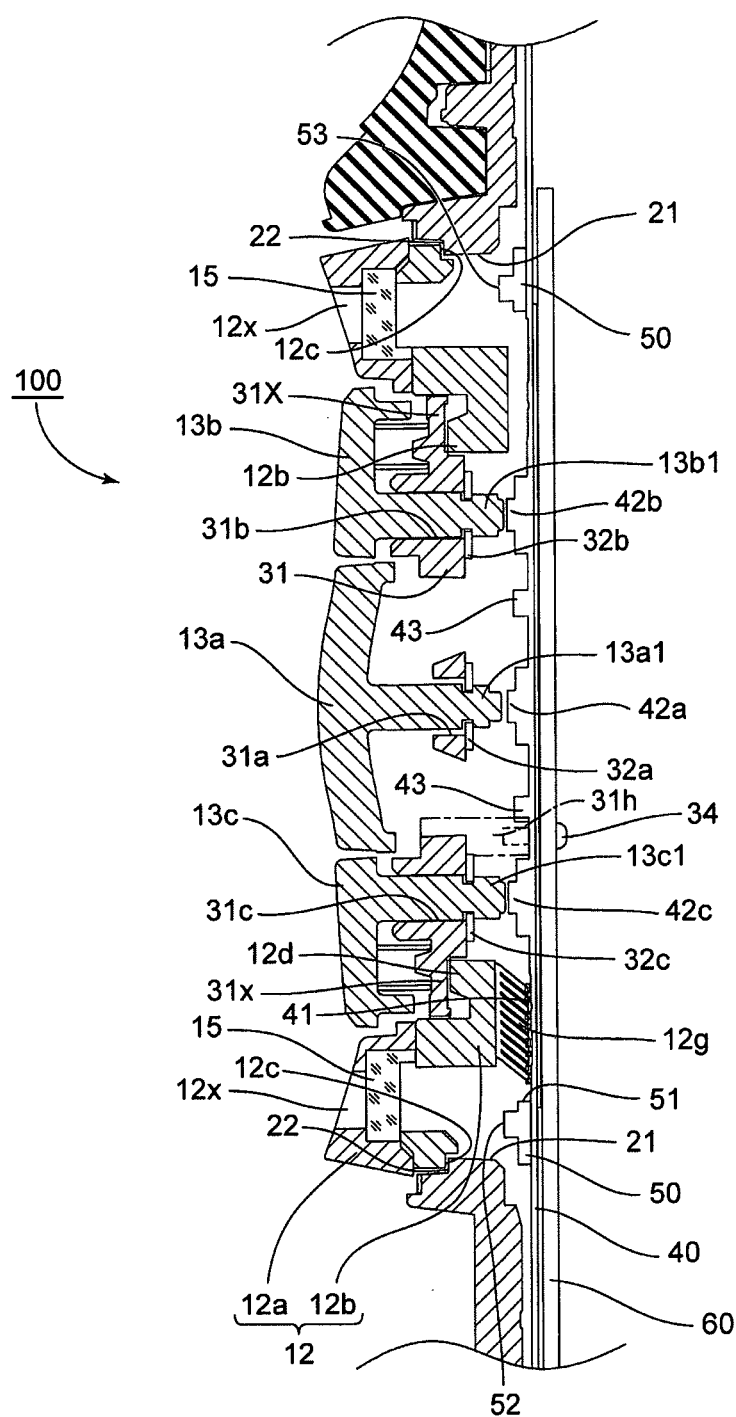
FIG. 4 is a sectional view taken along IV-IV line shown in FIG. 1, viewed in the direction of the appended arrows.

As shown in FIGS. 2 and 4, the rotational operation dial 12 is configured of a dial-body ring 12a and a brush ring 12b which is integrally fixed to an inner peripheral side of the dial-body ring 12a; the dial-body ring 12a and the brush ring 12b are both hollow members. A stepped portion 12c is formed on a peripheral rim of the brush ring 12b which engages with the round guide stepped portion 22 so that the rotational operation dial 12 (the dial-body ring 12a and the brush ring 12b) rotates relative to the round guide stepped portion 22 via the stepped portion 12c of the rotational operation dial 12. Furthermore, a retainer projection (retained projection) 12d which projects radially inwards is formed on the inner periphery of the rotational operation dial 12 (brush ring 12b). The rotational operation dial 12 is a switch for selecting exposure modes, such as: AUTO (automatic exposure), P (programmed exposure), Sv (ISO speed priority), etc., in accordance with the rotational position (shifted position) of the rotational operation dial 12. Character indications 12x are formed through the rotational operation dial 12 (dial-body ring 12a); the character indications 12x indicate (distinguish) the exposure modes: AUTO (automatic exposure), P (programmed automatic exposure), Sv (shutter-priority automatic exposure), . . . , SCN (scene-specific programmed automatic exposure), etc., on the surface (peripheral-edge surface portion) of the rotational operation dial 12 along a circumferential direction thereof at predetermined intervals. A light-guide plate 15, formed out of a transparent material, is fixed on the inner side (underside) of the dial-body ring 12a while facing against the character indications 12x. In an alternative, it is possible to form the dial-body ring 12a itself out of a transparent material and apply (print) a predetermined pattern (character indications 12x) on the dial-body ring 12a using light-shielding paint after first applying (printing) a transparent coating thereon, as required, thereby reducing the number of components and facilitating manufacture.

A push-button switch unit 30, which is provided with push-button switches (depressing-operation members) 13, is inserted into a central opening 12f of the rotational operation dial 12, and the rotational operation dial 12 is retained in the body rear-side 10B by the push-button switch unit 30 being mounted onto the body rear-side 10B. The push-button switch unit 30 is a sub-assembly, in which a plurality of push-button members (depressing-operation members) 13a through 13e are supported in a sub-assembly member 31. The push-button members 13a through 13e include a central OK button 13a, an ISO button 13b positioned above the central OK button 13a, a white balance button 13c positioned below the central OK button 13a, a flash button 13d positioned on the left side of the central OK button 13a, and a drive button 13e positioned on the right side of the central OK button 13a, as viewed from the rear of the camera body 10.

Figure 3:
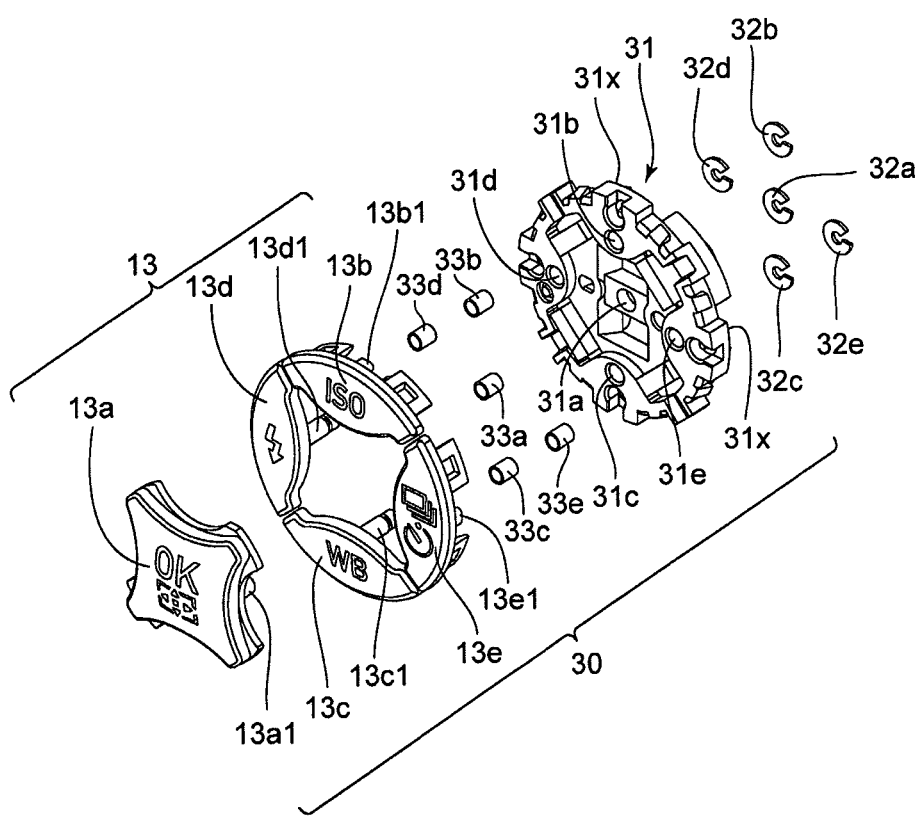
FIG. 3 is an exploded view of a push-button switch unit of the variable-position operation device shown in FIG. 1.

As shown in FIG. 3, the push-button members 13a through 13e, which are formed as synthetic resin molded articles, are respectively provided with shaft members 13a1 through 13e1; furthermore, slide holes 31a through 31e, into which the shaft members 13a1 through 13e1 are slidably inserted, respectively, are formed in the sub-assembly member 31, which is a molded article that is likewise formed out of synthetic resin material. Retainer C-rings 32a through 32e are respectively fixed onto the ends of the shaft members 13a1 through 13e1 that project through and out from the slide holes 31a through 31e. Furthermore, compression springs 33a through 33e are respectively inserted in between the push-button members 13a through 13e and the sub-assembly member 31, so that the push-button members 13a through 13e are biased (held) at the outward projecting extremity thereof.

The push-button switch unit 30 is completed as a sub-assembly upon inserting the shaft members 13a1 through 13e1 into the slide holes 31a through 31e of the sub-assembly member 31 with the compression springs 33a through 33e inserted in between the sub-assembly member 31 and the push-button members 13a through 13e, and fixing the C-rings 32a through 32e onto the ends of the shaft members 13a1 through 13e1 that project through the slide holes 31a through 31e, respectively. Hence, the above-mentioned outward projecting extremities of the push-button members 13a through 13e are respectively determined by the C-rings 32a through 32e pressing against a retainer annular part 31x of the sub-assembly member 31.

Figure 5:
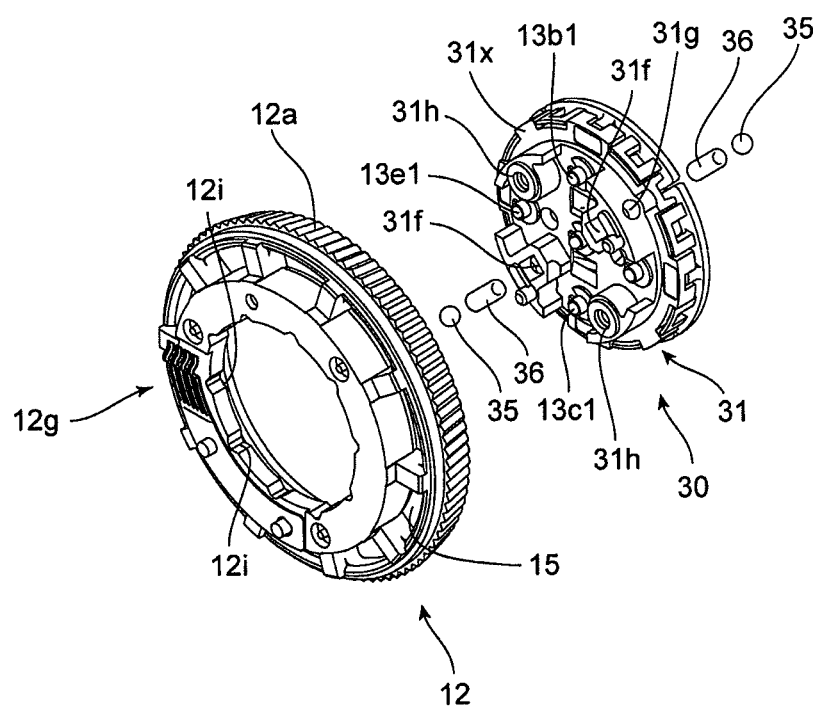
FIG. 5 is an exploded view of the push-button switch unit shown in FIG. 3, as viewed from the underside.

Furthermore, a click-stop mechanism which causes the rotational operation dial 12 to click stop at predetermined rotational angles is provided between the rotational operation dial 12 and the push-button switch unit 30. FIG. 5 shows the above-mentioned click-stop mechanism. The click-stop mechanism is provided with a plurality of click-stop grooves 12i which are formed at predetermined equi-angular intervals on an inner peripheral surface 12h of the central opening 12f of the rotational operation dial 12, and balls 35, provided in the sub-assembly member 31 of the push-button switch unit 30, which radially move inward and outward from an outer peripheral surface of the sub-assembly member 31 and engage with the click-stop grooves 12i, respectively. A pair of spring-accommodation holes 31f, which extend in diametrically opposite radial directions orthogonal to the rotational axis of the rotational operation dial 12, are formed in the sub-assembly member 31, and one compression spring 36 and one ball 35 are inserted in each spring-accommodation hole 31f. Holes 31g, through which the balls 35 can respectively move radially outward and inward, are formed through (open at) the outer peripheral surface of the sub-assembly member 31 and are communicatively connected with the spring-accommodation holes 31f, respectively. The balls 35 are each biased by the associated compression spring 36 to move outward from, and into, the associated hole 31g.

In order to configure the variable-position operation device 100 by combining the rotational operation dial 12 and the push-button switch unit 30, the rotational operation dial 12 is fitted into the round opening 21 of the body rear-side 10B. Subsequently, the stepped portion 12c of the brush ring 12b engages with the round guide stepped portion 22 so that the rotational operation dial 12 is relatively rotatable on the round guide stepped portion 22. In this state, the push-button switch unit 30 is fitted inside the central opening 12f of the rotational operation dial 12. Accordingly, the retainer annular part 31x of the sub-assembly member 31 engages with the retainer projection 12d of the rotational operation dial 12, thereby retaining the rotational operation dial 12. In this state, upon a mounting screw 34 (see FIGS. 2 and 4) being inserted through the body rear-side 10B from the front side (inner side of the camera body 10) thereof to mount the sub-assembly member 31 to the body rear-side 10B (details of which are discussed below), the variable-position operation device 100 is completed. At this stage, the push-button switch unit 30 is fitted into the central opening 12f of the rotational operation dial 12 with the compression springs 36 and the balls 35 inserted into the spring-accommodation holes 31f. The balls 35 project from the outer peripheral surface of the sub-assembly member 31 by the biasing force of the compression springs 36, are pressed by the inner peripheral surface 12h of the rotational operation dial 12, roll along the inner peripheral surface 12h upon the rotational operation dial 12 being rotated, and when the balls 35 align with (oppose) the click-stop grooves 12i, the balls 35 engage with the click-stop grooves 12i thereby increasing the rotational load (rotational torque) of the rotational operation dial 12. In other words, the rotational operation dial 12 click-stops at the rotational positions at which the balls 35 fit into the click-stop grooves 12i. The balls 35 and the click-stop grooves 12i are formed so that one of the character indications 12x aligns with an indicator mark 18 (formed on the body rear-side 10B; see FIG. 1) at a position at which the rotational operation dial 12 has click-stopped.

A circuit board (first board/flexible printed circuit board) 40 for detecting the rotational position of the rotational operation dial 12 is provided inside the body rear-side 10B. A brush (first electrical contact) 12g (see FIGS. 4 and 5) is fixed onto the brush ring 12b of the rotational operation dial 12, and lands (second electrical contact) 41, with which the brush 12g is in sliding contact, are formed on the circuit board 40. The brush 12g is formed of a resilient metal material such as a copper alloy, etc., and the lands 41 are formed of a conductive material such as copper, etc. The lands 41 in the illustrated embodiment are configured of a plurality of circular-arc shaped sectors along imaginary circles that are concentric with the rotational center of the rotational operation dial 12, and are configured so that the lands 41 can detect the rotational position (variable position) of the rotational operation dial 12 at an angular resolution of 36 degrees (at a rotational angle unit of 36 degrees) via the combination of the plurality of circular-arc sectors. Furthermore, the inner area on the circuit board 40 that is surrounded by the lands 41 is provided with switch members (depression-detection members) 42a through 42e at positions corresponding to (opposing) the push-button members 13a through 13e of the push-button switch unit 30; the switch members 42a through 42e detect the depressing of the shaft members 13a1 through 13e1 of the push-button members 13a through 13e, respectively. The variable-position operation device 100 can be slimmed down in size due to the arrangement in which the lands 41, which detect the rotational position of the rotational operation dial 12, and the switch members 42a through 42e, which detect the depression of the push-button members 13a through 13e, respectively, are provided on the same single surface of a single circuit board 40. The resolution of the detection of the variable position (rotational position) of the rotational operation dial 12 is not limited to that of the illustrated embodiment and the detection intervals do not need to be equal.

Furthermore, a sub-circuit board (second board/printed circuit board) 50 which serves as a second circuit board is also provided on the inner side of the body rear-side 10B. The sub-circuit board 50 is joined onto the circuit board 40, the circuit board 40 is fixed onto a chassis (backing circuit board) 60, and the chassis 60 is fixed to the body rear-side 10B with mounting screws 61 from the front side (inner side) of the body rear-side 10B. The push-button switch unit 30 is fixed to the chassis 60 with mounting screws 34 which pass through insertion through-holes 45 formed in the circuit board 40 and are screwed into threaded holes of corresponding bosses 31h formed on the sub-assembly member 31 from the front side (inner side) of the body rear-side 10B.

The sub-circuit board 50 is provided with a round opening 51 which is formed in a central portion of the sub-circuit board 50 and exposes the lands 41 of the circuit board 40, the switch members 42a through 42e, and light-emitting elements 43. A plurality of light-emitting elements (surface mounted LEDs) 52 having the same light-emitting color (e.g., green), and one different-colored light-emitting element (surface mounted LED) 53 which emits a different colored light (e.g., red) from that of the light-emitting elements 52 are arranged around the periphery of the round opening 51 and are soldered thereto. The light-emitting color of the light-emitting elements 43 can be the same or different from that of the light-emitting elements 52 or 53.

The sub-circuit board 50 and the circuit board 40 are layered onto and joined to each other by soldering a plurality of electrodes (lands) 54 that are provided on an edge portion of the sub-circuit board 50 to a plurality of electrodes (lands) 44 formed on a surface of the circuit board 40 and correspond to the electrodes 54. The different-colored light-emitting element 53 is provided at a position that corresponds to the character indication 12x of the rotational operation dial 12 that coincides with the indicator mark 18, when the circuit board 40 and the sub-circuit board 50 are mounted onto the body rear-side 10B, and the plurality of light-emitting elements 52 are provided at positions that correspond to the remaining character indications 12x. These light-emitting elements 52 and 53 emit light for a predetermined amount of time or flash on-and-off when a predetermined operation is performed, such as when the power of the digital camera is switched ON, or when the rotational operation dial 12 is manually rotated. The light that the light-emitting elements 52 and 53 emit is display light that is made incident onto the light-guide plate 15, exits from the character indications 12x while illuminating the character indications 12x. Since the character indications 12x are illuminated by the light-emitting elements 52 emitting light, it is easy for the characters of the character indications 12x to be visibly recognized, and since the character indication 12x that coincides with the indicator mark 18 is illuminated by the different-colored light-emitting element 53 with a different color from that of the remaining character indications 12x, it is easy for the character of the character indication 12x that coincides with the indicator mark 18 to be visibly recognized. The light-emitting elements 43 emit light when the OK button 13a is depressed, etc., when the OK button 13a is in a state where it can be depressed.

In the illustrated embodiment, since the circuit board 40, which includes the lands 41, and the sub-circuit board 50, which includes the light-emitting elements 52 and 53, are formed as separate boards (circuit boards), there is no danger of the lands 41 being contaminated by gas or solder residue that occurs during soldering since the light-emitting elements 52 and 53 can be soldered to the sub-circuit board 50, which is spaced away from the circuit board 40. Furthermore, after the light-emitting elements 52 and 53 are soldered onto the sub-circuit board 50, the light-emitting elements 52/53 and the lands 41 can be brought into close proximity of each other, or are made to partially overlap each other, in a plan view, so that the area occupied by the light-emitting elements 52 and 53 and the lands 41 can be reduced in a plan view, enabling miniaturization of the diameter of the variable-position operation device 100. There is also no danger of the lands 41 being contaminated by gas or solder residue that occurs during soldering when electronic components other than the light-emitting elements 52 and 53 (that are mounted onto the sub-circuit board 50) are soldered onto the sub-circuit board 50.

In the illustrated embodiment, since the sub-circuit board 50 which is provided with the light-emitting elements 52 and 53 is spaced away (is positioned rearwardly) from the circuit board 40 that is provided with the lands 41, the distance (space) between the character indications 12x and the light-emitting elements 52/53 (in the forward/rearward direction of the camera body 10) is small (narrow) so that only a small amount of light can outwardly escape from the character indications 12x while a sufficient distance (space) between the brush ring 12b (which is provided on the brush 12g) of the rotational operation dial 12 and the lands 41 can be obtained, thereby enabling the variable-position operation device 100 to be slimmed down (reduced in size in the forward/rearward direction of the camera body 10).

Although the present invention has been described in an embodiment applied to a digital camera, the present invention can be applied to all manner of electronic devices including video digital cameras and mobile electronic devices, and also can be applied to controllers of such electronic devices, etc.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A variable-position operation device, provided on an electronic-device body, comprising:
   a variable-position operation member which shifts upon an operation thereof;
   a first electrical contact which shifts in accordance with the operation of said variable-position operation member;
   a second electrical contact which detects a shifted position of said first electrical contact, which is in sliding contact with said second electrical contact, in accordance with a shifted position of said variable-position operation member; and
   at least one light-emitting element, wherein a light-emitting state of said light-emitting element changes in accordance with said shifted position of said variable-position operation member,
   wherein said second electrical contact is provided on a first board, and
   wherein said light-emitting element is provided on a second board, said second board being provided as a separate member from that of said first board.

2. The variable-position operation device according to claim 1, wherein said variable-position operation member comprises a rotational operation member,
   wherein said second electrical contact is formed in a circular-arc shape that is concentric with a rotational center of said rotational operation member,
   wherein said second board includes an opening which exposes said second electrical contact, provided on said first board, and
   wherein said at least one light-emitting element is provided on said second board along said opening.

3. The variable-position operation device according to claim 2, wherein a plurality of said light-emitting elements are provided, and wherein at least one of said light-emitting elements emits a different colored light from that of the remaining said light-emitting elements.

4. The variable-position operation device according to claim 2, wherein at least one depressing-operation member is provided at an inner radial position within said rotational operation member, and
   wherein a depression-detection member which detects a depressing of said depressing-operation member is provided on said first board.

5. The variable-position operation device according to claim 3, wherein at least one depressing-operation member is provided at an inner radial position within said rotational operation member, and
   wherein a depression-detection member which detects a depressing of said depressing-operation member is provided on said first board.

6. The variable-position operation device according to claim 1, comprising a plurality of said light-emitting elements, wherein at least one of said light-emitting elements emits a different colored light from that of the remaining said light-emitting elements.

7. The variable-position operation device according to claim 1, wherein said variable-position operation member comprises a rotational operation member.

8. A variable-position operation device, provided on an electronic-device body, comprising:
   a variable-position rotational operation member which shifts upon an operation thereof;
   a first electrical contact which shifts in accordance with the operation of said variable-position rotational operation member;
   a second electrical contact which detects a shifted position of said first electrical contact, which is in sliding contact with said second electrical contact, in accordance with a shifted position of said variable-position rotational operation member; and
   at least one light-emitting element which is arranged to emit light onto said variable-position rotational operation member,
   wherein said second electrical contact is provided on a first board in a circular-arc shape that is concentric with a rotational center of said rotational operation member,
   wherein said at least one light-emitting element is provided on a second board including an opening which exposes said second electrical contact, provided on said first board, said second board being provided as a separate member from that of said first board, and
   wherein said at least one light-emitting element is provided on said second board along said opening.

9. A variable-position operation device, provided on an electronic-device body, comprising:
   a variable-position operation member which shifts upon an operation thereof;
   a first electrical contact which shifts in accordance with the operation of said variable-position operation member;
   a second electrical contact which detects a shifted position of said first electrical contact, which is in sliding contact with said second electrical contact, in accordance with a shifted position of said variable-position operation member; and
   at least one light-emitting element, wherein a light-emitting state of said light-emitting element changes in accordance with said shifted position of said variable-position operation member,
   wherein said second electrical contact is provided on a first board,
   wherein said light-emitting element is provided on a second board, and
   wherein said first board and said second board are detachable from each other.

10. The variable-position operation device according to claim 9, wherein said variable-position operation member comprises a rotational operation member.

11. A variable-position operation device, provided on an electronic-device body, comprising:
   a variable-position operation member which shifts upon an operation thereof;
   a first electrical contact which shifts in accordance with the operation of said variable-position operation member;
   a second electrical contact which detects a shifted position of said first electrical contact, which is in sliding contact with said second electrical contact, in accordance with a shifted position of said variable-position operation member; and
   at least one light-emitting element, wherein a light-emitting state of said light-emitting element changes in accordance with said shifted position of said variable-position operation member,
   wherein said second electrical contact is provided on a first board,
   wherein said light-emitting element is provided on a second board, and
   wherein said first board and said second board overlay each other and are provided in said electronic-device body.

12. The variable-position operation device according to claim 11, wherein said variable-position operation member comprises a rotational operation member.

13. The variable-position operation device according to claim 8, wherein said at least one light-emitting element comprises a plurality of said light-emitting elements arranged about the perimeter of said opening.

14. The variable-position operation device according to claim 8, comprising a plurality of said light-emitting elements, wherein at least one of said light-emitting elements emits a different colored light from that of the remaining said light-emitting elements.

15. The variable-position operation device according to claim 8, wherein at least one depressing-operation member is provided at an inner radial position within said rotational operation member, and
   wherein a depression-detection member which detects a depressing of said depressing-operation member is provided on said first board.

16. The variable-position operation device according to claim 8, wherein said opening comprises an aperture through which said second electrical contact is exposed.

17. A variable-position operation device, provided on an electronic-device body, comprising:
   a variable-position rotational operation member which shifts upon an operation thereof;
   a first electrical contact which shifts in accordance with the operation of said variable-position rotational operation member;
   a second electrical contact which detects a shifted position of said first electrical contact, which is in sliding contact with said second electrical contact, in accordance with a shifted position of said variable-position rotational operation member; and
   at least one light-emitting element which is arranged to emit light onto said variable-position rotational operation member,
   wherein said second electrical contact is provided on a first board in a circular-arc shape that is concentric with a rotational center of said rotational operation member,
   wherein said light-emitting element is provided on a second board including an opening which exposes said second electrical contact, provided on said first board,
   wherein said at least one light-emitting element is provided on said second board along said opening, and
   wherein said first board and said second board are detachable from each other.

18. The variable-position operation device according to claim 17, wherein said at least one light-emitting element comprises a plurality of said light-emitting elements arranged about the perimeter of said opening.

19. The variable-position operation device according to claim 17, wherein said opening comprises an aperture through which said second electrical contact is exposed.

20. A variable-position operation device, provided on an electronic-device body, comprising:
   a variable-position rotational operation member which shifts upon an operation thereof;

a first electrical contact which shifts in accordance with the operation of said variable-position rotational operation member;

a second electrical contact which detects a shifted position of said first electrical contact, which is in sliding contact with said second electrical contact, in accordance with a shifted position of said variable-position rotational operation member; and at least one light-emitting element which is arranged to emit light onto said variable-position rotational operation member, wherein said second electrical contact is provided on a first board in a circular-arc shape that is concentric with a rotational center of said rotational operation member, wherein said light-emitting element is provided on a second board including an opening which exposes said second electrical contact, provided on said first board, wherein said at least one light-emitting element is provided on said second board along said opening, and wherein said first board and said second board overlay each other and are provided in said electronic-device body.

21. The variable-position operation device according to claim 20, wherein said first board and said second board overlay each other in a direction orthogonal to a plane defined by a varying direction of said variable-position rotational operation member, said first board and said second board being provided in said electronic-device body.

22. The variable-position operation device according to claim 21, wherein said varying direction comprises a rotational direction of said variable-position rotational operation member.

23. The variable-position operation device according to claim 20, wherein said at least one light-emitting element comprises a plurality of said light-emitting elements arranged about the perimeter of said opening.

24. The variable-position operation device according to claim 20, wherein said opening comprises an aperture through which said second electrical contact is exposed.

* * * * *